United States Patent
Morcom et al.

[11] Patent Number: 5,864,778
[45] Date of Patent: Jan. 26, 1999

[54] DEVICE AND PROCESS FOR MEASURING AND CALCULATING GEOMETRICAL PARAMETERS OF AN OBJECT

[75] Inventors: Christopher Morcom, Celle; Carsten Sachs, Hanover; Oliver Wenke, Neustadt, all of Germany

[73] Assignee: Vialog Visuelle Automations Anlagen GmbH, Garbsen, Germany

[21] Appl. No.: 702,454

[22] PCT Filed: Apr. 5, 1995

[86] PCT No.: PCT/DE95/00467

§ 371 Date: Nov. 20, 1996

§ 102(e) Date: Nov. 20, 1996

[87] PCT Pub. No.: WO95/27184

PCT Pub. Date: Oct. 12, 1995

[30] Foreign Application Priority Data

Apr. 5, 1994 [DE] Germany ............... 44 11 498.2
Oct. 17, 1994 [DE] Germany ............... 44 37 096.2

[51] Int. Cl.$^6$ ................................................. G01B 11/24
[52] U.S. Cl. .................... 702/158; 356/376; 356/385; 356/386; 250/559
[58] Field of Search ............... 364/562; 356/372, 356/375, 376, 385, 386, 387; 250/559.21–559.29

[56] References Cited

U.S. PATENT DOCUMENTS 5,278,632  1/1994  Shotwell ................. 356/376

FOREIGN PATENT DOCUMENTS 0 346 288  12/1989  European Pat. Off. ........ G01B 11/08
0 403 908  11/1990  European Pat. Off. ........ G01B 11/24

OTHER PUBLICATIONS

Article: 111 Werkstattstechnik. ZXeitschrift for Industriele Fertigung; vol. 73 (1983) Oct., No. 10 Würzburg, Deutschland; Inventors: H.J. Warnecke and C. Keferstein; Title: Optoelektronische Koordinatenmeβ Technik.
Patents abstracts of Japan, Inventor: Nishihara Sadamitsu; Title: Optical Measuring Machine; Publication No: JP63128213; Publication Date: May 31, 1988.

Primary Examiner—Kamini Shah
Attorney, Agent, or Firm—Burns, Doane, Swecker & Mathis, L.L.P.

[57] ABSTRACT

A device for measuring and calculating the geometrical parameters of an object includes a basic body, a movable and rotatable supporting apparatus for the object, two movable optical area measuring sensors, two illuminating devices allocated to the area measuring sensors, displacement and angle detectors allocated to the supporting apparatus and to the movable optical area measuring sensors, a monitor which is coupled to the area measuring sensors, a computer coupled to the displacement and angle detectors and to the optical area measurement sensors or the monitor, which computer includes a data input device and controllable displacement and rotation devices for the supporting apparatus as well as area measuring sensors being aligned at a right angle to each other and at a right angle or parallel to the axis of rotation of the supporting apparatus. A first area measuring sensor is arranged as a transmitted light measuring sensor and is arranged on a first slide which is movable perpendicularly to the axis of rotation of the supporting apparatus. A second area measurement sensor is arranged as an incident light measuring sensor and is arranged on the second movable slide. The second slide is held on the first slide and is movable perpendicularly to the axis of rotation of the supporting apparatus and to the direction of displacement of the first slide.

46 Claims, 5 Drawing Sheets

| Name | Definition |
|---|---|
| Diameter | *Circle* (MP 1, MP 2, MP 3) |
| Land of twist drill | *Line* (MP 3, MP 13) |
| Effective tool side rake | *Angle* (MP 3, MP 16, MP 3, MP 10) |

DEVICE AND PROCESS FOR MEASURING AND CALCULATING GEOMETRICAL PARAMETERS OF AN OBJECT

BACKGROUND AND SUMMARY OF THE INVENTION

The invention relates to a device for measuring and calculating geometrical parameters or an object.

Such a device and such a process are known from EP 0 403 908. The known device comprises a basic body with a table on which a supporting apparatus for an object is displaceable. Above the table there is arranged a tripod structure which consists of three legs attached to the edge of the table, which are supplemented upwardly into a T-like portal. The three legs are mutually displaced by 90°. Cameras are arranged or the legs which are movable on tracks in the vertical direction. A further stationary camera is situated in the centre of the T-like portal. The three cameras which are arranged on the legs as well as the camera which is arranged in the portal are directed towards the longitudinal central axis of the table. Illuminating devices are directly arranged on the respective cameras, which are directed towards the object to be measured.

The cameras are connected to an image Processing system. The profiles of the object to be measured are recorded simultaneously under several different angles of view. The measured profiles are compared with set profiles and displayed as curve diagrams or tables.

The cameras are exclusively arranged as incident light cameras, so that the supporting apparatus has to be moved for the measurement of various measuring points of the object in such a way that the measuring point is formed sharply in the cameras. The acquisition of the measured values is complicated and requires continuous control by the operating staff, because in the case of unfocused imaging the magnitude relationship of the reproduced points with the original would be erroneous and would lead to measuring errors.

The invention is thus based on the object or improving the aforementioned device in such a way that the measuring points can be accessed in a purposeful way, thus rendering the performance of the measurement simpler, faster and preciser.

This object is achieved in a device pursuant to the present invention.

In a first optical area measuring sensor, which is arranged as a transmitted light measuring sensor, the profile outline of the object to be measured is reproduced as a shadow image. As the image plane of the shadow of the profile outline is independent of the diameter of the object to be measured, the necessity concerning a separate adjustment of the distance between the object to be measured and the transmitted light measuring sensor for the focussing can be omitted. The imaging relationship of the shadow image of the object on the transmitted light measurement sensor is always constant, so that a determined measuring point on the outer profile of the object to be measured can be accessed by a second area measuring sensor arranged as an incident light measuring sensor in such a purposeful manner that this point is reproduced in the calibration plane and thus in the correct imaging scale on the incident light measuring sensor. A check concerning the sharpness by the operating staff is thus not required.

If the incident light measuring sensor id situated on a second slide which is jointly movable with the slide on which the transmitted light measuring sensor is arranged, then a selected measuring point can be accessed, for example, by driving the first slide with the transmitted light measuring sensor in such a way that it coincides with a marking which is identical with the calibration plane of the incident light measuring sensor. On reaching the point on the outer profile, the incident light measuring sensor is precisely situated in the position in which the same point is reproduced sharply. The imaging relationship of several points situated in the same plane is thus correct.

Preferably, the first slide is exclusively movable in one axial direction relative to the basic body and the supporting apparatus is arranged on a third slide which is movable relative to the basic body in the direction of the axis of rotation.

By limiting the degrees of freedom by which the first slide on the one hand and the third slide on the other hand are movable, there is a direct relationship of the paths of travel to the basic body, so that the adjustment faults which cannot be fully excluded in practice only enter the measuring results directly, but do not multiply, as would be the case in the overlapping of movements in several degrees of freedom. The overall measuring precision is thus improved over the known device.

To detect a measuring point from a third perspective it is possible to arrange on the second slide a third area measuring sensor which is arranged as an incident light measuring sensor, whose optical axis is aligned perpendicularly to the optical axes of the other area measuring sensors, or a pentaprism can optionally be inserted in the path of the rays of the incident light measuring sensor, through which the measuring axis of the incident light measuring sensor is deflectable at a right angle to its optical axis and the optical axis of the transmitted light measuring sensor.

Although the first alternative requires a higher technical complexity owing to the presence of a third area measuring sensor, it nevertheless offers the advantage that the image reproduction of a measuring point can occur simultaneously under three directions of observation. In the second alternative the pentaprism has to be inserted into the path of the rays in order to change the directions or observation of the incident light sensor. The two directions of observation can occur, however, through one and the same incident light measuring sensor. In addition to saving a third area measuring sensor, this solution also avoids the otherwise required holding means for the further area measuring sensor, so that a reduction in weight can thus be gained and the bearing and the drive for the second slide can be arranged more simply. This also reduces the stress on the first slide and its drive. By using a pentaprism it is ensured that the direction of observation of the incident light sensor is deflected precisely at a right angle and the precision of the alignment of the pentaprism does not enter the measuring result as a measuring error.

An illuminating device allocated to the transmitted light measuring sensor is preferably arranged coaxially to the optical axis of the transmitted light measuring sensor on the first slide on the side of the rotational axis of the light measuring sensor and comprises a collimator optical system which emits a parallel luminous pencil. The transmitted light measuring sensor comprises a telecentric optical system. This arrangement ensures that an object projects in any position of the path of the rays between the illuminating device and the transmitted light measuring sensor a shadow image with a sharp profile on the transmitted light measuring sensor with a constant imaging scale. This enables precise measurements of the outer profile for each size and position of an object to be measured without having to take any adjustment measures.

The illuminating device allocated to the incident light measuring sensor is arranged as an annular light which is arranged coaxially to the optical axis of the incident light measuring sensor. This arrangement of the illuminating device provides a very even illumination of the surface of the object to be measured. This ensues that leaps in the brightness only occur at the edges and corners of the imaged object, but not from an uneven illumination.

The optical system of the incident light measuring sensor is preferably adjusted in such a way that the optical axis of the transmitted light measuring sensor is situated in the calibration plane of the incident light measuring sensor. The two surface measuring sensors are a mutually coupled by this measure, whereby on displacing the transmitted light measuring sensor to a selected measuring point the same measuring point is automatically reproduced sharply on the incident light measuring sensor in another direction of observation which is rotated by 90°.

pursuant to a further development, a light barrier with a parallel small-calibre light pencil is arranged on the first slide parallel and adjacent to the transmitted light measuring sensor as well as on the level of its optical axis, and a sensor of the light barrier is connected with the computer. With this light barrier it is possible to carry out automatically an initial positioning of the axis. On crossing the light barrier, the free end of the object to be measured is then reproduced automatically in the centre of the transmitted light measuring sensor. If the object to be measured concerns a processing tool for example in which the measuring points to be accessed for determining the geometric parameters are situated in the vicinity of the free end of the object, then these areas are simultaneously reproduced on the transmitted light measuring sensor and can be accessed in a purposeful manner over the shortest possible path.

A least one distance sensor, which is connected to the computer, can be arranged next to the incident light measuring sensor and on the level of its optical axis. The surface profile can be scanned with this distance sensor by rotating the object, so that at first a rough alignment of the rotating position is possible through the determination of the distance minima and maxima or maxima of the distance gradients, which can then be corrected following the changeover to the transmitted light measuring sensor and the incident light measuring sensor.

Preferably, the distance sensor is arranged as an optical sensor, e.g. as a laser triangulator or as a mechanical scanner. A very fast contactless acquisition of measured values is possible with the laser triangulator. The mechanical scanner is favourably used in cases where a contactless optical measurement would supply imprecise results owing to the surface structure of the object to be measured or is not accessible to an optical measurement in cases of areas disposed in the inside of the object.

In a practical embodiment the path of movement of the slide towards the object is limited by a safety distance from the object. This excludes collisions by improperly clamped bodies or by faulty operations during the movement of the slides.

Concerning the process for measuring and calculating geometrical parameters, the invention is based on the object of improving a method pursuant to the preamble of claim 12 in the respect that optionally all relevant geometrical parameters of an object to be measured can be determined with as few measuring steps as possible and with high precision.

this object is achieved with a method pursuant to the present invention.

The object is positioned at first in its axial and rotational position in such a way that the relevant measuring points are in the imaging zone of the area measuring sensors or are in their ultimate vicinity, so that the measuring points can be accessed in a purposeful manner over short paths of movement. Depending on the type of the geometrical parameters to be measured and calculated, one or several process steps are carried out thereafter in order to place the measuring points or to calculate their coordinates. The desired geometrical parameters of the object can then be calculated according to mathematical functions from individual measuring points of ones that are linked into groups. Several alternatives are possible for the evaluation of the geometrical parameters. The geometrical parameters can either be displayed or stored in order to obtain the characteristic parameters for an object. Furthermore, it is possible that the parameters are compared with an article database in order to separate defective products through quality control or to evaluate and sort them according to quality classes. In addition, there is also the possibility to provide follow-up control to a production machine on the basis of a statistical evaluation of the geometrical parameters so as to take influence on the quality already during production and to reduce the rejection rate of defective items.

To enable the measurement of coordinates of measuring points of the object which are disposed in lower regions than the outer profile of the object and thus cannot be reproduced on the transmitted light measuring sensor, it is provided that the coordinates are determined by moving the incident light measuring sensor from an initial position to a position in which the measuring point is reproduced sharply on the incident light measuring sensor and by measuring the path of movement. As an alternative this can also occur by contactless distance measurement with an optical distance sensor, e.g. a laser triangulator, or by moving a scanner up to the point of contact with the measuring point when a contactless optical measurement of the inner profile of a hollow object, for example, is not possible. A surface profile of such interior areas can also be obtained from a plurality of such coordinates gained.

The incident light measuring sensor is moved depending on the position of the transmitted light measuring sensor, with the incident light measuring sensor being focused on the optical axis of the transmitted light measuring sensor. This mandatorily results in a coupling of the two area measuring sensors, so that by accessing a point on the surface profile of the object by the transmitted light measuring sensor this point is automatically reproduced sharply on the incident light measuring sensor. Measuring points which are situated in the same imaging plane as the incident light measuring sensor can be measured by the incident light measuring sensor without any further displacing movements.

An initial axial positioning of the object can be carried out in such a way that the object and the transmitted light measuring sensor are moved relative to one another so far in the direction of the rotational axis until the maximum of the outer profile of the object extending in the direction of the rotational axis crosses the beam of a light barrier arranged on the level of the optical axis of the transmitted light measuring sensor. During this rough positioning the relevant measuring points are located in measuring sensor and can be accessed in a purposeful manner. This type of initial axial positioning is possible with fast speeds of travel and automatically, so that the total time required to access the individual measuring points can be reduced.

An initial rotational positioning of the object can be carried out in such a way that the object is turned and that a continuous measurement of the distance between the surface of the object and the distance sensor is carried out by means of the distance sensor and the object is finally placed in a rotational position in which one of the distance minima or the distance gradient maxima is in a predetermined rotational position towards the optical axis of the transmitted light measuring sensor. This process can also be carried out automatically at a high rotational speed, which contributes in reducing the entirely required time for accessing the measuring points.

A further increase in the precision can be obtained when a potential inclined position of the object is determined by forming the difference between different diameter or distance extreme values in at least one plane and a wobble cone is calculated from the difference of the diameter and distance extreme values, with the calculated coordinates being corrected by the distance of the envelope surface of the cone from the rotational axis. It is possible by such a correction to eliminate errors which may occur as a result of wear and tear, soiling or other faults in the supporting apparatus or during its operation.

several alternatives can be used in determining the measuring points. The measuring points can be predetermined manually for example in order to measure an object individually. Furthermore, search areas of the measuring points can be predetermined manually in a first step. In a second step the corners and/or edges of the object situated in these search areas are determined automatically in that the position of the corners and/or edges is determined by an image processing program from the evaluation of the changes in at least one characteristic of the image reproduction of the object on the area measuring sensors, such as changes in the course of the brightness or texture or colour of the image reproduction of the object on the area measuring sensors.

This measure only requires roughly accessing the measuring points and is thus faster than the aforementioned variant and, concerning its precision, is independent of the precision with which the operator accesses the measuring points.

It is furthermore possible to have search areas of the measuring points calculated in a first step by entering parameters for groups of bodies to be measured, to automatically predetermine the search areas in a second step and to automatically determine in a third step the corners and/or edges of the object situated if these search areas in such a way that the position of the corners and/or edges is determiner by an image processing program from the evaluation of the changes in at least one characteristic of the image reproduction of the object on the area measuring sensors, such as changes in the course of the brightness or texture or colour of the image reproduction of the object on the area measuring sensors.

This alternative places low requirements of the instructions for the operating staff and allows the automatic quality control of products. As the measuring points to be accessed need not be determined manually, this alternative allows a particularly fast determination of the desired geometrical parameters.

According to a third alternative, the measuring points can be determiner automatically by scanning a plurality of points on corners and/or edges of the object, with the position of the corners and/or edges being determined by an image processing program from the evaluation of the changes in at least one characteristic of the image reproduction of the object on the area measuring sensors, such as changes in the course of the brightness or texture or colour of the image reproduction of the object on the area measuring sensors. This measure allows a fully automatic determination of the geometrical parameters of bodied. As contrary to the aforementioned alternatives it is necessary in this case to access several measuring points, a higher measuring time must be expected here.

Pursuant to a further development, the geometrical parameters of a subject processed with the processing tool can be calculated from the geometrical parameters of an object arranged as a processing tool.

This measure allows, for example, on the basis of predetermined tolerances to determine the tolerances of a processing tool with which the subject can be produced under adherence to the predetermined tolerances.

It is further possible to calculate from the geometrical parameters of an object arranged as a subject the geometrical parameters of a processing tool which is used for its production.

In this way it is possible to obtain construction data for the construction of a suitable tool.

BRIEF DESCRIPTION OF THE DRAWINGS

The device and the process on accordance with the invention are explained below by reference to an embodiment, with the drawing showing.

DETAILED DESCRIPTION

Figure 1:
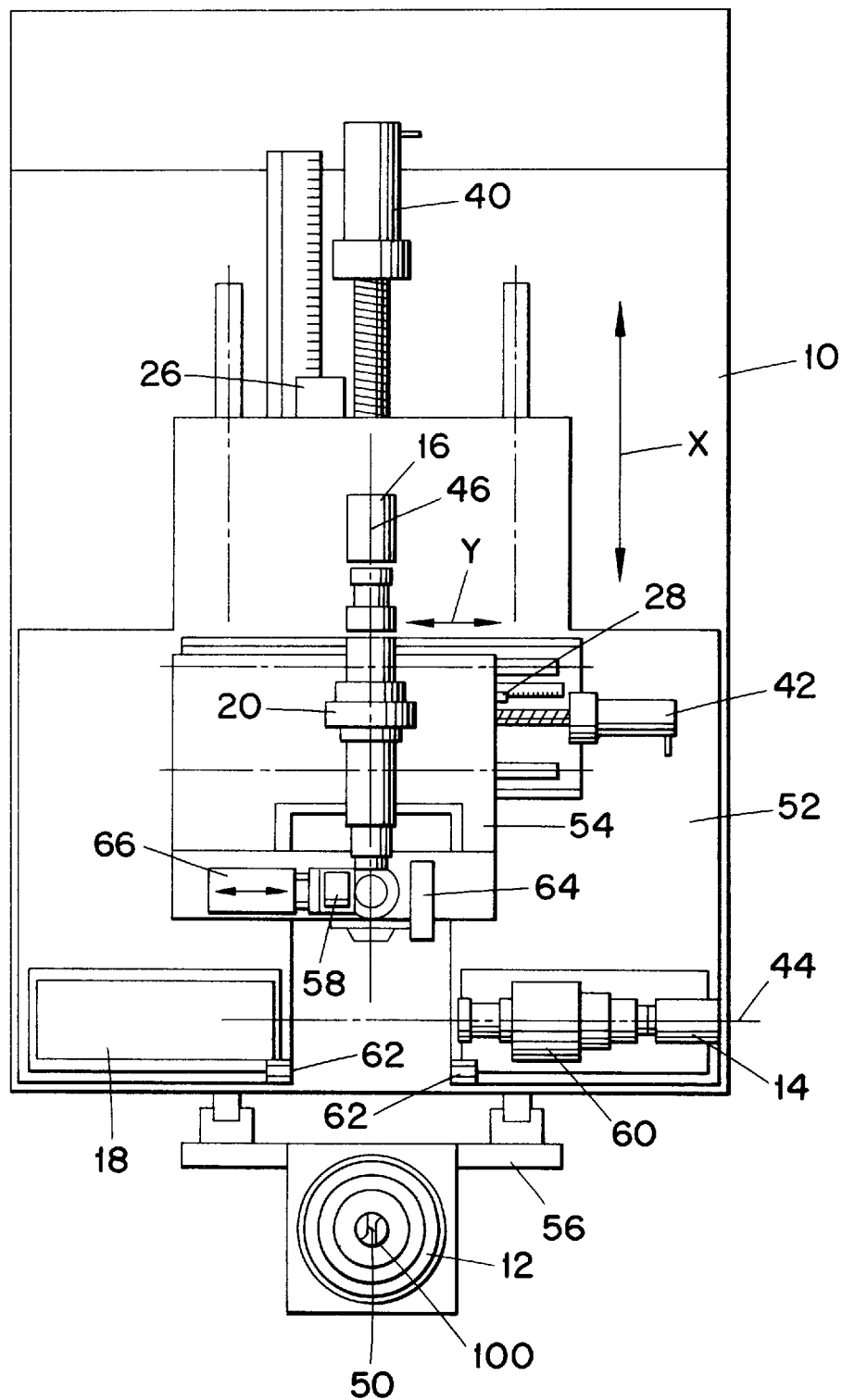
FIG. 1 shows a top view on a schematically represented device.
Figure 2:
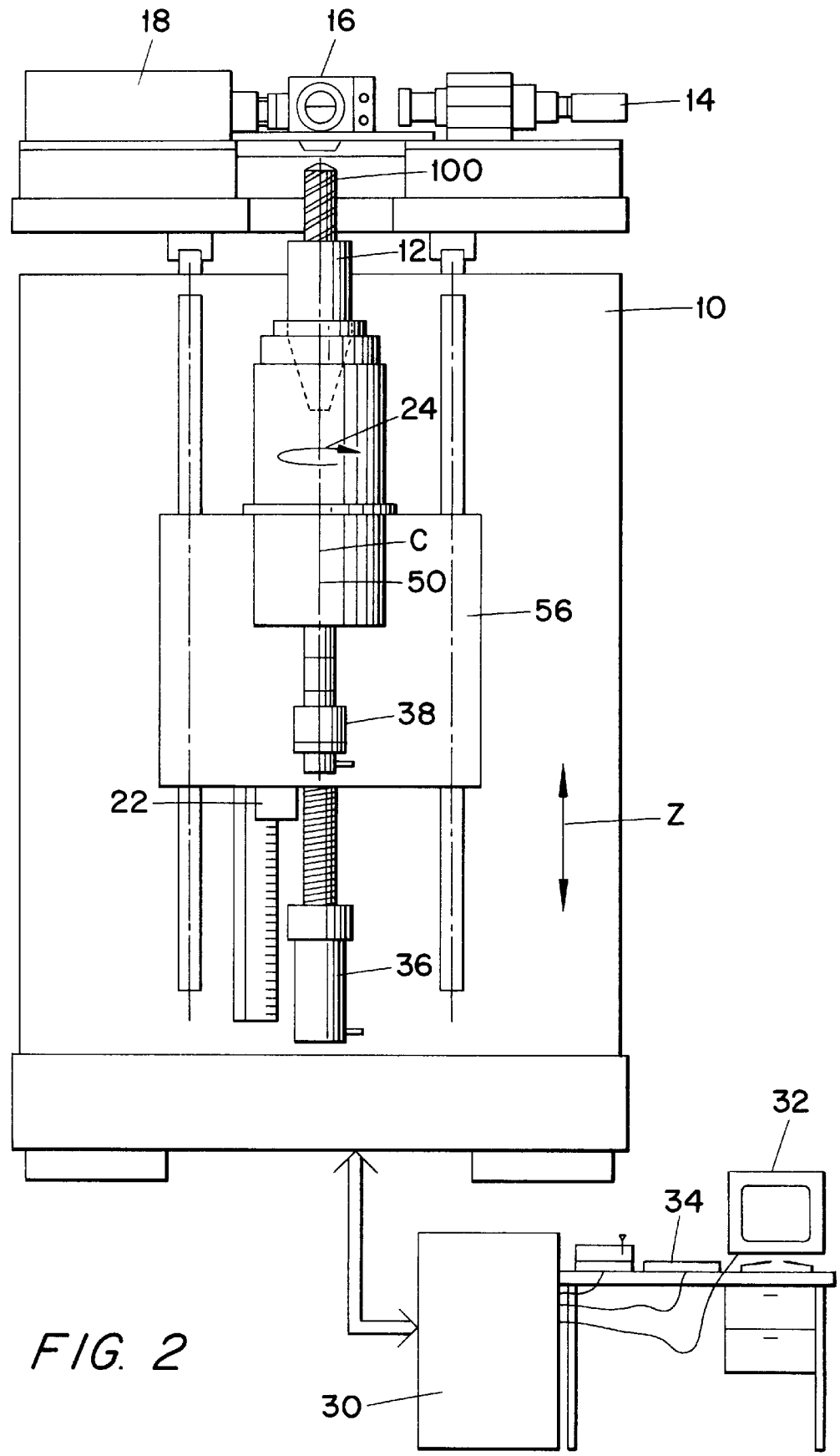
FIG. 2 shows a side view of a schematically represented device.

In the embodiment the device comprises a basic body 10, which can be arranged as a massive block of granite for example. The basic body 10 carries a first movable slide 52 with a transmitted light measuring sensor 14 whose optical axis 44 is aligned parallel to a Y-axis and which is movable in the X-direction on the slide 52 by means of a drive 40. Opposite of the transmitted light measuring sensor 14, which can be arranged as a CCD camera, there is disposed an illuminating device 18. The illuminating device 18 comprises a light source and an optical system which emits a parallel light pencil coaxially to the optical axis 44 of the transmitted light measuring sensor 14. The transmitted light measuring sensor 14 comprises a telecentric optical system 60, thus ensuring that an undistorted shadow image, which does not contain any imaging errors, of an object 100 to be measured is reproduced on the transmitted light measuring sensor 14 in a high depth of focus.

A light barrier 62 is also located on the first slide 52 next to the transmitted light measuring sensor 14 and on the same level as its optical axis 44.

A second slide 54 which is movable in the Y-direction is arranged on the first slide 52. An incident light measuring sensor 16 is situated on said second slide 54, which sensor is aligned in the X-direction. An illuminating device 20 which is arranged as an annular lamp is allocated to said incident light measuring sensor 16. Furthermore, a pentaprism 58 is situated on the second slide 54 which can be inserted into the path of rays of the incident light measuring sensor 16 by means of an actuating apparatus 66 and which deflects the direction of observation by 90° in the direction of the Z-axis. A further illuminating device is provided for illuminating this direction of observation. A distance measuring apparatus 64 is further provided on the second slide 54 which consists of a laser triangulator or a scanner.

The basic body 10 further carries a third slide 56 with a supporting apparatus 12 for an object 100 to be measured. The supporting apparatus 12 is movable on the slide 56 in the direction of a Z-axis and rotatable about a C-axis.

the slides comprises displacing drives 36, 40, 42 and displacement sensors 22, 26, 28, and the supporting apparatus 12 comprises a rotational drive 38 and an angle sensor 24. Moreover, the device comprises a monitor 30 for displaying the images of the area measuring sensors 14, 16 and a computer 32 with which the measuring sensors 14, 15, 62, 64 and the displacement and angle sensors 22, 24, 26, 28 are connected and through which the drives 36, 38, 40, 42 are controllable.

To acquire measuring points the object 100 to be measured is placed at first in the supporting apparatus 12 and then clamped. The supporting apparatus 12 is then moved in the Z direction until the maximum of the outer profile extending in the direction of this axis 50 intersects with the ray of the light barrier 62 and thus stops the displacing drive 36. If the object 100 is not provided with a rotation-symmetric outer profile, such as is the case in a drill or milling cutter, the object 100 must be brought thereafter into a preliminary rotational position. For this purpose the object 100 is made to rotate by means of the rotational drive 38 and the distance is continuously measured by means of the laser triangulator 64. The rotational movement is finally stopped at a position where a distance gradient maximum occurs. The distance gradient maximum now stands perpendicular to the optical axis 44 of the transmitted light measuring sensor 14.

A shadow image of the object 100 in this rotational position is reproduced on the transmitted light measuring sensor 14. Where an exact positioning is required, a point is marked on the outer profile and a changeover to the incident light measuring sensor 16 is made. In its image it is recognized whether the object 100 to be measured is positioned correctly or whether the edge is not situated in the centre, e.g. in a crossweb. If the object is not positioned correctly, the displacement from the centre is measured by means of the incident light fine adjustment means. The displacement measured is converted into a corrective angle of rotation by taking the diameter of the object into account in order to position the object with the correct rotational position.

After the positioning in the correct rotational position and a changeover to the transmitted light measuring sensor 14, one or several measuring points can be determined on the profile of the shadow image. The transmitted light measuring sensor 14 is moved to these in the X direction until a marker, e.g. a crossweb, coincides with this measuring point. A fine positioning can be made in the manner that the marking, following a manual rough positioning, is positioned precisely on the edge in such a way that this corner is determined by an image processing program from the evaluation of the changes in at least one characteristic of the image reproduction of the object on the area measuring sensors, such as changes in the course of the brightness or texture or colour of the image reproduction of the object.

As a result of the co-movement of the incident light measuring sensor 16, the same measuring profile is also reproduced sharply on the incident light measuring sensor 16 and can be displayed on the monitor 30 when it is switched to the incident light measuring sensor 16. Further measuring points can now be marked on the representation of the incident light image. If the central image reproduction of the measuring point is not situated on an edge, then the rotational position can still be corrected and, following the changeover of the monitor display to the transmitted light measuring sensor 14, it is possible to carry out thereafter a correction of the position of the sensors by displacement in the X direction.

The same measuring point can also be reproduced from a direction of observation in the Z direction in that the pentaprism 58 is inserted into the path of rays of the incident light measuring sensor 16. From this direction of observation it is possible to mark further measuring points. If the measuring points are not situated in a plane parallel to the imaging plane, then the preliminary coordinates which are determined through the imaging scale or via the paths of displacement can be corrected by changing the rotational position of the object 100 and repeating the measurements with the transmitted light measuring sensor 14 and the incident light measuring sensor 16 from the two different directions of observation and by taking into account the measured angle of rotation.

Measurements of the coordinates of measuring points which are situated in lower regions or in inner regions of the object 100 can be determined by distance measurements. A distance measurement is possible with the incident light measuring sensor 16 in such a way that it is displaced on the first slide 52 until the selected measuring point is reproduced sharply and the path of movement that has been covered is stored. Furthermore, distance measurements by means of the laser triangulator or the mechanical scanner are possible.

When all required measuring points have been determined, several measuring points are combined into groups for calculating geometrical values which cannot be determined directly from a measuring point. The geometrical parameters are calculated from these measuring points by using mathematical functions.

Figure 3:
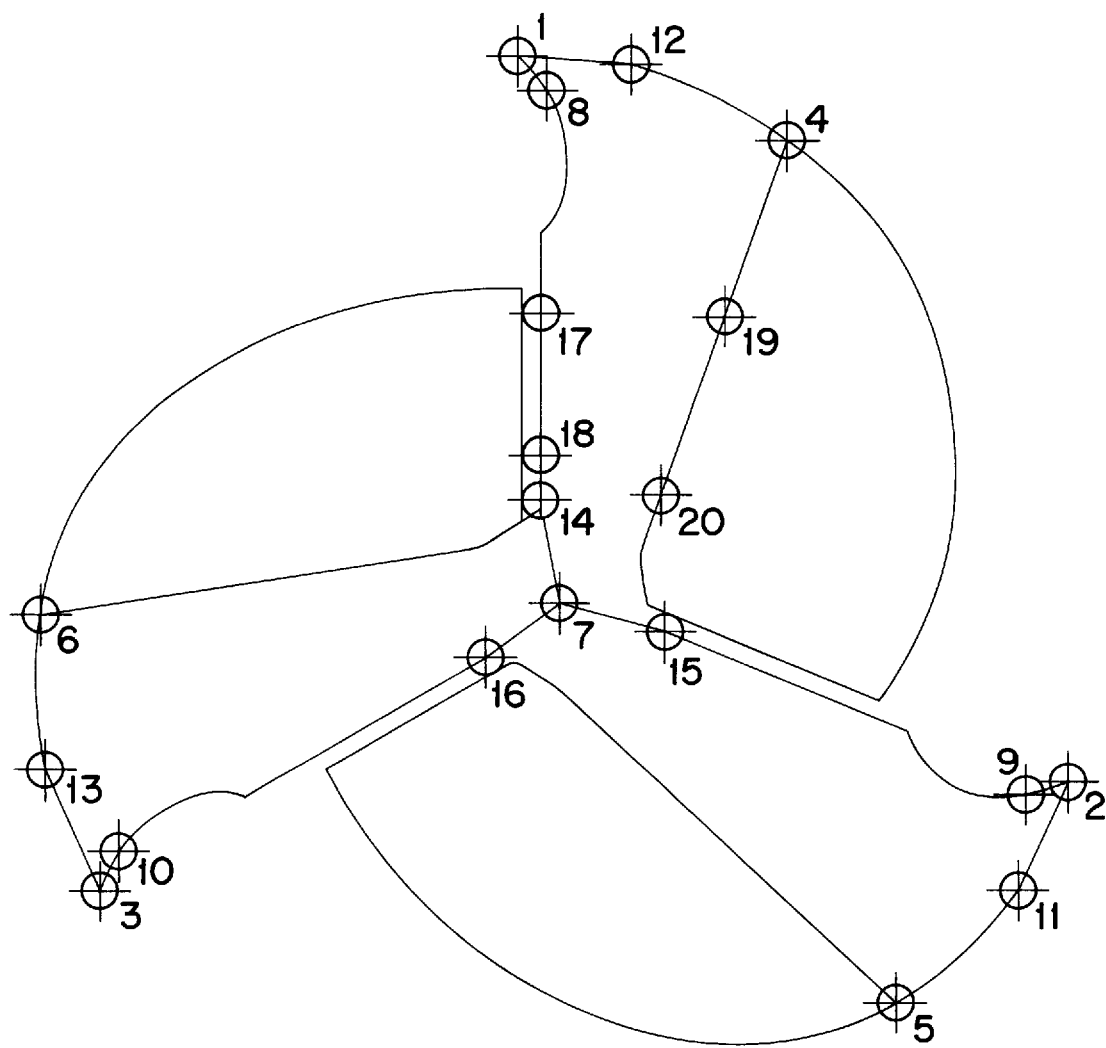
FIG. 3 shows a reproduction of an object to be measured with marked measuring points.

FIG. 3 shows, as an example, a representation of the face side of a milling cutter on which a number of measuring points are marked which are required for the calculation of characteristic geometrical parameters of this object.

Figure 4:
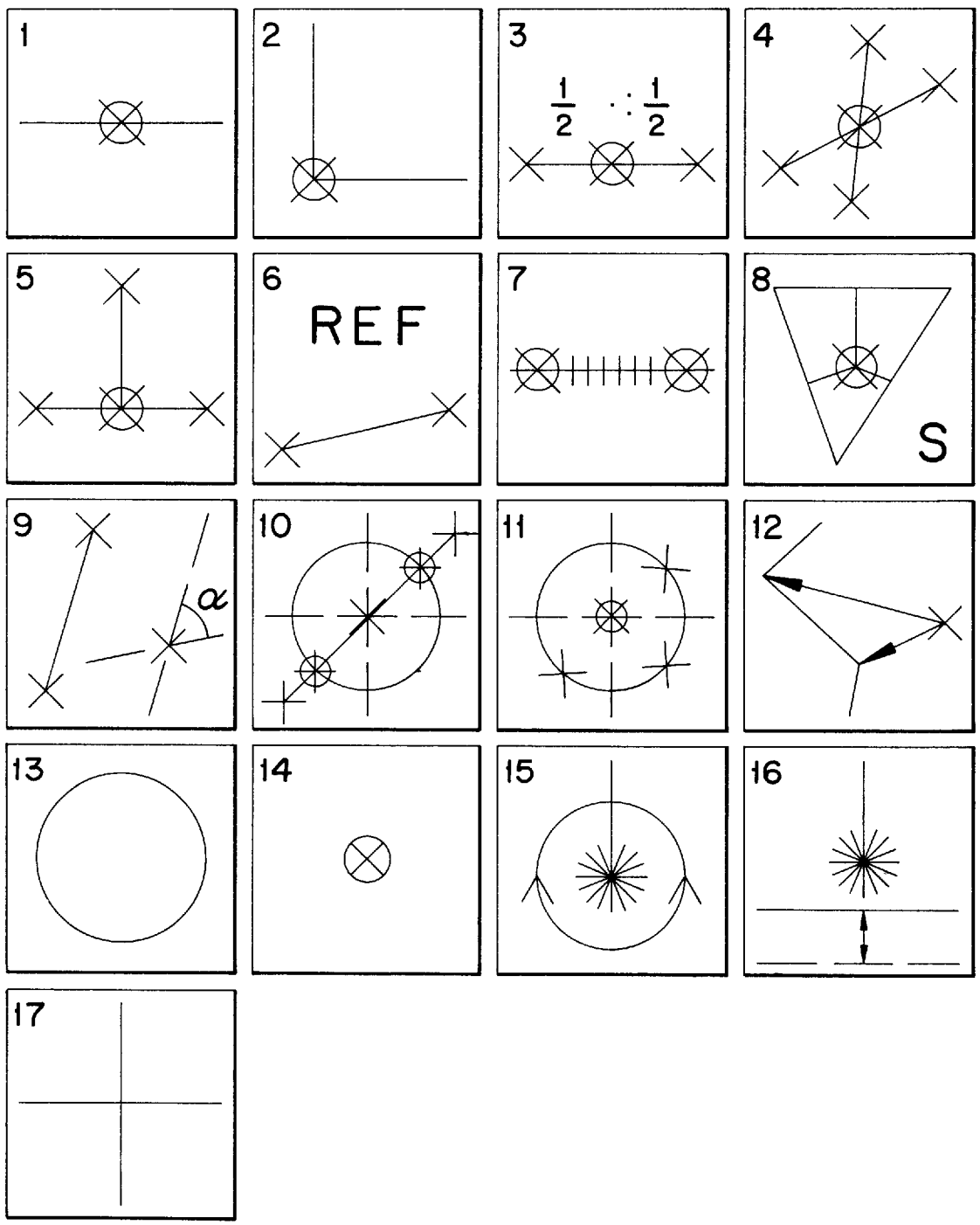
FIG. 4 shows a representation of a selection of predetermined symbols on the screen of a computer for determining the measuring points.
Figures 5, 6:
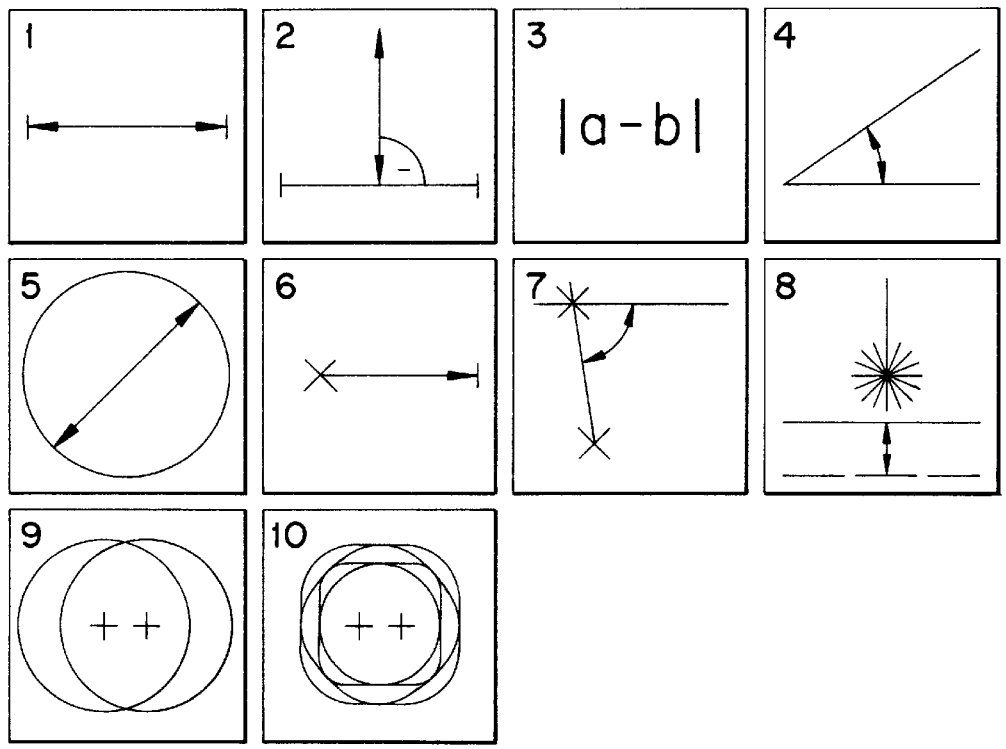
FIG. 5 shows a representation of a selection of predetermined symbols on the screen of a computer for determining the measuring criteria.
FIG. 6 shows a table for linking the measuring points according to measuring criteria.

FIG. 4 shows a selection of predetermined symbols of the screen of a computer for determining the measuring points. By activating the individual symbols through the keyboard of an input apparatus of by means of a mouse, a program is activated in the computer which automatically carries out the determination of the measuring points. The symbols have the following meaning:

1. Find an edge—automatic detection of (determined in FIG. 3, e.g. measuring point 8, 9, 10, 13, etc.)
2. Find a corner—automatic detection of a corner (e.g. measuring point 1, 2, 3, etc.)
3. Central point of path—supplies the central point between two measuring points as a measuring point
4. Points of intersection straight line/straight line—supplies the point of intersection of two straight lines as measuring point 5. A point vertically beneath a given point—projects a measuring point orthogonally on a straight line by two measuring points
6. Reference base—offers the possibility to change the reference base
7. Edge regression—carries out an edge regression between two measuring points and determines the optimal edge on the subject. The measuring points are corrected thereafter so that they come to lie on the optimal edge (elimination of errors by edge misalignments)
8. Center of gravity—determines the center of gravity of measuring points (also for forming the mean value)
9. Auxiliary line—for designing any straight line (angle, position)
10. Point of intersection between straight line/circle—supplies the point of intersection between a straight line and a circle as a measuring point
11. Centre of circle—supplies the central point of a circle (e.g. the measuring point 7 of measuring point 1, 2, 3). At least three measuring points are required. Up to 8 measuring points are possible.
12. Min./Max. distance—supplies the minimal or maximal distance from a basic point on the profile of the subject as measuring point
13. Auxiliary circle—displays a measuring circle of any size and position
14. Auxiliary point—offers the possibility of placing any desired auxillary point
15. Laser adjustment—automatic defined turning out of the object
16. Laser distance measurement—determination of measuring points with the laser triangulator
17. Coordinate crossweb—designs a crossweb of any desired size and position The determination of the measuring criteria occurs through the linkage of the measuring points on the basis of an instruction list, as is shown in FIG. 6. The instruction list is drawn up by the selection of the required linkage module and by entering the respective measuring points. Several modules are available for the linking. FIG. 5 shows a representation of a selection of predetermined symbols on the screen of a computer for determining the measuring criteria, whose meanings are as follows:

1. Path—determines the path between two measuring points. It is also possible to output only the horizontal or vertical distance between the points.
2. Distance—determines the orthogonal distance of a measuring point on the basic line of two measuring points
3. Difference—shows the difference between two measuring criteria
4. Angle—provides the angle of intersection between two straight lines
5. Circle—carries out a circle approximation with a minimum of 5 measuring points. Up to maximum of 8 measuring points can be entered.
6. Single-point measurement—determines the distance of a measuring point to a fixed reference point
7. Angle/straight line—determines the angle of a straight line of two measuring points to a fixed straight line (e.g. 0 degrees to the horizontal line, 90 degrees to the vertical lines, etc.)
8. Laser measurement—determines the distance between a measuring point and the laser triangulator
9. wobbling movement—determines the wobbling error of the tool including the collet
10. Truth of rotation—checks the actual truth of rotation by compensating the wobbling error gained with module 9

The user selects the respective module for a measuring criterion and is asked by the computer to enter the measuring points required by the module. The existing measuring points can be used several times for the Individual linkages.

During the later execution of the instruction list by the computer program, the determination of a circle is carried out in this example at first with the measuring points MP 1, MP 2 and MP 3 and the diameter is determined.

The second instruction determines the path between the measuring points MP 3 and MP 13 which corresponds to the straight land width of the blade.

The determination of the side slope occurs with the third instruction. The computer forms a straight line between the measuring points MP3 and MP 16 as well as MP 3 and MP 10 and outputs the angle of intersection for these two straight lines.

The instruction list can contain any desired number of instructions with a plurality of linkages between the measuring points. It is possible to give, among others, instructions for angle, distance, length or circle measurements. The individual measuring points can be used several times.

We claim:

1. A device for measuring and calculating geometrical parameters of an object which comprises a basic body, a movable and rotatable supporting apparatus for the object, at least two movable optical area measuring sensors, at least two illuminating devices at least one of the at least two illuminating devices being associated with a corresponding one of the at least two area measuring sensors, displacement and angle detectors allocated to the supporting apparatus and to the area measuring sensors, a monitor which can be coupled to the area measuring sensors, a computer coupled to the displacement and angle detectors and to one of the optical area measuring sensors and the monitor, which computer comprises a data input device and controllable displacement and rotation devices for the supporting apparatus and the as area measuring sensors, with optical axes of the area measuring sensors being aligned at a right angle to each other and at a right angle to an axis of rotation of the supporting apparatus, wherein a first area measuring sensor is arranged as a transmitted light measuring sensor and is arranged on a first slide which is movable perpendicularly to the axis of rotation of the supporting apparatus and at least one second area measuring sensor is arranged as an incident light measuring sensor and is arranged on a second movable slide, with a second slide being held on the first slide and being perpendicularly movable to the axis of rotation of the supporting apparatus and to a direction of displacement of the first slide, and the supporting apparatus and the first slide are movable relative to one another longitudinally to the axis of rotation of the supporting apparatus.

2. A device as claimed in claim 1, wherein the first slide is movable exclusively in one axial direction relative to the basic body and the supporting apparatus is arranged on a third slide which is movable relative to the basic body in a direction of the axis of rotation of the supporting apparatus.

3. A device as claimed in claim 1, wherein a third area measuring sensor is arranged on the second slide, which sensor is arranged as an incident light measuring sensor and has an optical axis that is aligned perpendicularly to the optical axes of the first and second area measuring sensors.

4. A device as claimed in claim 1, wherein a pentaprism is insertable into a path of rays of the second area measuring sensor, by means of which a measuring axis of the second area measuring sensor is deflectable at a right angle to its optical axis and to the optical axis of the first area measuring sensor.

5. A device as claimed in claim 1, wherein an illuminating device corresponding to the first area measuring sensor is arranged coaxially to an optical axis of the first area measuring sensor on the first slide on a side of the axis of rotation of the supporting apparatus opposite to the first area measuring sensor and comprises a collimator optical system which emits a parallel light pencil and the transmitted light measuring sensor comprises a telecentric optical system.

6. A device as claimed in claim 1, wherein an illuminating device corresponding to the first area measuring sensor is arranged coaxially to an optical axis of the second area measuring sensor.

7. A device as claimed in claim 1, wherein an optical system of the second area measuring sensor is adjusted in such a way that an optical axis of the first area measuring sensor is situated in a calibration plane of the second area measuring sensor.

8. A device as claimed in claim 1, wherein a light barrier with a parallel small-calibre light pencil is arranged on the first slide parallel and next to the first area measuring sensor and on a level of the optical axis of the first area measuring sensor, with a sensor of the light barrier being connected to the computer.

9. A device as claimed in claim 1, wherein at least one distance sensor connected with the computer is arranged on the second slide next to the second area measuring sensor and on a level of an optical axis of the second area measuring sensor.

10. A device as claimed in claim 9, wherein the distance sensor is arranged as an optical distance sensor.

11. A device as claimed in claim 1, wherein a path of displacement of the first and second slides towards the object is limited by a safety distance from the object.

12. A process for measuring and calculating geometrical parameters of an object received by a movable and rotatable supporting apparatus by means of at least two movable optical area measuring sensors to which illuminating devices are allocated, with optical axes of the area measuring sensors being aligned at a right angle towards each other and at a right angle to the axis of rotation of the supporting apparatus, comprising the steps of:

a) bringing the object into a preliminary axial and rotational position;

b) gaining a shadow image of the object by means of a first ore of the area measuring sensors arranged as a transmitted light measuring sensor;

c) determining a selected measuring point and marking the measuring point on a profile of the shadow image and calculating coordinates of the measuring point perpendicular to the image plane by an image processing program relative to the preliminary position;

d) fading in at least one reference marker;

e) moving the transmitted light measuring sensor and the object relative to each other from the defined initial position until the reference marker coincides with selected measuring point on the profile of the shadow image;

f) measuring path of displacement of the object and the transmitted light measuring sensor such that the paths of displacement serve as coordinates of a defined rotational position;

g) bringing the object into a defined axial and rotational position;

h) calculating geometrical parameters of coordinates of several measuring points of the profile of the shadow image;

i) reproducing the measuring point on the profile of the shadow image as a reference point on a second one of the area measuring sensors arranged as an incident light measuring sensor, the second area measuring sensor having an optical axis that is aligned perpendicularly to an optical axis of the first area measuring sensor, marking further measuring points on the image of the object, calculating coordinates of the further measuring points by an image processing program relative to the reference point and the first area measuring sensor;

j) moving the first area measuring sensor and the object relative to one another from the initial position until a reference marker coincides With the selected measuring points on the image of the object;

k) measuring paths of displacement of the object and the first measuring sensor;

l) calculating selected measuring points;

m) measuring an angle of rotation of measuring points situated on a curved area by rotating the object about an axis of the supporting apparatus;

n) repeating steps a)–l) until coordinates of all required measuring points have been detected;

o) calculating desired geometrical parameters of the object according to mathematical functions from the coordinates of the measuring points.

13. A process as claimed in claim 12, comprising the further step of determining coordinates of a second measuring point of the object that is situated in lower regions than an outer profile of the object by moving the incident light measuring sensor from an initial position into a position in which the coordinates of the second measuring point is reproduced on the incident light measuring sensor.

14. A process as claimed in claim 12, comprising the further step of moving the second area measuring sensor jointly with the first area measuring sensor, and, as the second area measuring sensor is moved jointly with the first area measuring sensor, focussing the second area measuring sensor on the optical axis of the first area measuring sensor.

15. A process as claimed in claim 12, wherein an initial axial positioning of the object includes moving the object and the first area measuring sensor relative to one another in a direction of the axis of rotation until a maximum of the outer profile of the object extending in a direction of the axis of rotation intersects with a beam of a light barrier arranged on a level of the optical axis of the first area measuring sensor.

16. A process as claimed in claim 12, wherein an initial rotational positioning of the object includes rotating the object and continuously measuring a distance between a surface of the object and a distance sensor, and placing the object in a rotational position in which one of a distance minima or a distance gradient maxima is in a predetermined rotational position to an optical axis of the first area measuring sensor.

17. A process as claimed in claim 16, wherein an inclined position of the object is determined in at least one plane by forming a difference of one of different diameter and distance extreme values, and, from the one of the difference of the diameter and the distance extreme values, calculating a wobbling cone and correcting calculated coordinates by a distance of an envelope surface of the cone from the axis of rotation.

18. A process as claimed in claim 12, wherein the measuring points are predetermined manually.

19. A process as claimed in claim 12, wherein search areas of the measuring points are predetermined manually in a first step and edges of the object situated in the search areas are determined automatically in a second step such that positions of the edges are determined by an image processing program from evaluation of changes in one or more characteristics of an image reproduction of the object on the area measuring sensors.

20. A process as claimed in claim 12, wherein search areas of the measuring points are calculated in a first step by entering parameters for groups of objects to be measured, the search areas are predetermined automatically in a second step and the edges of the object, which edges are situated in the search areas, are determined automatically in a third step such that positions of the edges are determined by an image processing program from evaluation of changes in one or more characteristics of an image reproduction of the object on the area measuring sensors.

21. A process as claimed in claim 12, wherein the measuring points are determined automatically by scanning a plurality of points on edges of the object, with positions of the edges being determined by an image processing program from evaluation of changes in one or more characteristics of an image reproduction of the object on the area measuring sensors.

22. A process as claimed in claim 12, wherein geometrical parameters of a subject processed with a processing tool are calculated from geometrical parameters of the object arranged as a processing tool.

23. A process as claimed in claim 12, wherein, from geometrical parameters of the object arranged as a subject, geometrical parameters of a processing tool which is used for production of the object are calculated.

24. A device for measuring and calculating geometrical parameters of an object which comprises a basic body, a movable and rotatable supporting apparatus for the object, at least two movable optical area measuring sensors, at least two illuminating devices at least one of the at least two illuminating devices being associated with a corresponding one of the at least two area measuring sensors, displacement and angle detectors allocated to the supporting apparatus and to the area measuring sensors, a monitor which can be coupled to the area measuring sensors, a computer coupled to the displacement and angle detectors and to one of the optical area measuring sensors and the monitor, which computer comprises a data input device and controllable displacement and rotation devices for the supporting apparatus and the as area measuring sensors, with optical axes of the area measuring sensors being aligned at a right angle to each other and parallel to an axis of rotation of the supporting apparatus, wherein a first area measuring sensor is arranged as a transmitted light measuring sensor and is arranged on a first slide which is movable perpendicularly to the axis of rotation of the supporting apparatus and at least one second area measuring sensor is arranged as an incident light measuring sensor and is arranged on a second movable slide, with a second slide being held on the first slide and being perpendicularly movable to the axis of rotation of the supporting apparatus and to a direction of displacement of the first slide, and the supporting apparatus and the first slide are movable relative to one another longitudinally to the axis of rotation of the supporting apparatus.

25. A device as claimed in claim 24, wherein the first slide is movable exclusively in one axial direction relative to the basic body and the supporting apparatus is arranged on a third slide which is movable relative to the basic body in a direction of the axis of rotation of the supporting apparatus.

26. A device as claimed in claim 24, wherein a third area measuring sensor is arranged on the second slide, which sensor is arranged as an incident light measuring sensor and has an optical axis that is aligned perpendicularly to the optical axes of the first and second area measuring sensors.

27. A device as claimed in claim 24, wherein a pentaprism is insertable into a path of rays of the second area measuring sensor, by means of which a measuring axis of the second area measuring sensor is deflectable at a right angle to its optical axis and to the optical axis of the first area measuring sensor.

28. A device as claimed in claim 24, wherein an illuminating device corresponding to the first area measuring sensor is arranged coaxially to an optical axis of the first area measuring sensor on the first slide on a side of the axis of rotation of the supporting apparatus opposite to the first area measuring sensor and comprises a collimator optical system which emits a parallel light pencil and the transmitted light measuring sensor comprises a telecentric optical system.

29. A device as claimed in claim 24, wherein an illuminating device corresponding to the first area measuring sensor is arranged coaxially to an optical axis of the second area measuring sensor.

30. A device as claimed in claim 24, wherein an optical system of the second area measuring sensor is adjusted in such a way that an optical axis of the first area measuring sensor is situated in a calibration plane of the second area measuring sensor.

31. A device as claimed in claim 24, wherein a light barrier with a parallel small-calibre light pencil is arranged on the first slide parallel and next to the first area measuring sensor and on a level of the optical axis of the first area measuring sensor, with a sensor of the light barrier being connected to the computer.

32. A device as claimed in claim 24, wherein at least one distance sensor connected with the computer is arranged on the second slide next to the second area measuring sensor and on a level of an optical axis of the second area measuring sensor.

33. A device as claimed in claim 32, wherein the distance sensor is arranged as an optical distance sensor.

34. A device as claimed in claim 24, wherein a path of displacement of the first and second slides towards the object is limited by a safety distance from the object.

35. A process for measuring and calculating geometrical parameters of an object received by a movable and rotatable supporting apparatus by means of at least two movable optical area measuring sensors to which illuminating devices are allocated, with optical axes of the area measuring being aligned at a right angle towards each other and parallel to the axis of rotation of the supporting apparatus, comprising the steps of:
   a) bringing the object into a preliminary axial and rotational position;
   b) gaining a shadow image of the object by means of a first one of the area measuring sensors arranged as a transmitted light measuring sensor;
   c) determining a selected measuring point and marking the measuring point on a profile of the shadow image and calculating coordinates of the measuring point perpendicular to the image plane by an image processing program relative to the preliminary position;
   d) fading in at least one reference marker;
   e) moving the transmitted light measuring sensor and the object relative to each other from the defined initial position until the reference marker coincides with the selected measuring point on the profile of the shadow image;

f) measuring paths of displacement of the object and the transmitted light measuring sensor such that the path of displacement serve as coordinates of a defined rotational position;

g) bringing the object into a defined axial and rotational position;

h) calculating geometrical parameters of coordinates of several measuring points of the profile of the shadow image;

i) reproducing the measuring point on the profile of the shadow image as a reference point on a second one of the area measuring sensors arranged as an incident light measuring sensor, the second area measuring sensor having an optical axis that is aligned perpendicularly to an optical axis of the first area measuring sensor, marking further measuring points on the image of the object, calculating coordinates of the further measuring points by an image processing program relative to the reference point and the first area measuring sensor;

j) moving the first area measuring sensor and the object relative to one another from the initial position until a reference marker coincides with the selected measuring points or the image of the object;

k) measuring path of displacement of the object and the first measuring sensor;

l) calculating selected measuring points;

m) measuring an angle of rotation of measuring points situated on a curved area by rotating the object about an axis of the supporting apparatus;

n) repeating steps a)–l) until coordinates of all required measuring points have been detected;

o) calculating desired geometrical parameters of the object according to mathematical functions from the coordinates of the measuring points.

36. A process as claimed in claim 35, comprising the further step of determining coordinates of a second measuring point of the object that is situated in lower regions than an outer profile of the object by moving the incident light measuring sensor from an initial position into a position in which the coordinates of the second measuring point is reproduced on the incident light measuring sensor.

37. A process as claimed in claim 35, comprising the further step of moving the second area measuring sensor jointly with the first area measuring sensor, and, as the second area measuring sensor is moved jointly with the first area measuring sensor, focussing the second area measuring sensor on the optical axis of the first area measuring sensor.

38. A process as claimed in claim 35, wherein an initial axial positioning of the object includes moving the object and the first area measuring sensor relative to one another in a direction of the axis of rotation until a maximum of the outer profile of the object extending in a direction of the axis of rotation intersects with a beam of a light barrier arranged on a level of the optical axis of the first area measuring sensor.

39. A process as claimed in claim 35, wherein an initial rotational positioning of the object includes rotating the object and continuously measuring a distance between a surface of the object and a distance sensor, and placing the object in a rotational position in which one of a distance minima or a distance gradient maxima is in a predetermined rotational position to an optical axis of the first area measuring sensor.

40. A process as claimed in claim 39, wherein an inclined position of the object is determined in at least one plane by forming a difference of one of different diameter and distance extreme values, and, from the one of the difference of the diameter and the distance extreme values, calculating a wobbling cone and correcting calculated coordinates by a distance of an envelope surface of the cone from the axis of rotation.

41. A process as claimed in claim 35, wherein the measuring points are predetermined manually.

42. A process as claimed in claim 35, wherein search areas of the measuring points are predetermined manually in a first step and edges of the object situated in the search areas are determined automatically in a second step such that positions of the edges are determined by an image processing program from evaluation of changes in or more characteristics of an image reproduction of the object on the area measuring sensors.

43. A process as claimed in claim 35, wherein search areas of the measuring points are calculated in a first step by entering parameters for groups of objects to be measured, the search areas are predetermined automatically in a second step and the edges of the object, which edges are situated in the search areas, are determined automatically in a third step such that positions of the edges are determined by an image processing program from evaluation of changes in one or more characteristics of an image reproduction of the object on the area measuring.

44. A process as claimed in claim 35, wherein the measuring points are determined automatically by scanning a plurality of points on edges of the object, with positions of the edges being determined by an image processing program from evaluation of changes in one or more characteristics of an image reproduction of the object on the area measuring sensors.

45. A process as claimed in claim 35, wherein geometrical parameters of a subject processed with a processing tool are calculated from geometrical parameters of the object arranged as a processing tool.

46. A process as claimed in claim 35, wherein, from geometrical parameters of the object arranged as a subject, geometrical parameters of a processing tool which is used for production of the object are calculated.

* * * * *